United States Patent
Fan et al.

(10) Patent No.: US 7,497,974 B2
(45) Date of Patent: Mar. 3, 2009

(54) CE,PR-COACTIVATED YTTRIUM PHOSPHATE PHOSPHOR AND LAMP CONTAINING SAME

(75) Inventors: Chen Wen Fan, Sayre, PA (US); Gregory A. Marking, Sayre, PA (US); Thomas M. Snyder, Laceyville, PA (US)

(73) Assignee: Osram Sylvania Inc., Danvers, MA (US)

( * ) Notice: Subject to any disclaimer, the term of this patent is extended or adjusted under 35 U.S.C. 154(b) by 283 days.

(21) Appl. No.: 11/461,525

(22) Filed: Aug. 1, 2006

(65) Prior Publication Data

US 2008/0030120 A1 Feb. 7, 2008

(51) Int. Cl.
*C09K 11/81* (2006.01)

(52) U.S. Cl. .............................. 252/301.4 P; 313/486; 313/638

(58) Field of Classification Search ........... 252/301.4 P; 313/486, 638
See application file for complete search history.

(56) References Cited

U.S. PATENT DOCUMENTS

| | | | | |
|---|---|---|---|---|
| 4,757,233 A | | 7/1988 | Peters et al. | |
| 5,116,532 A | * | 5/1992 | Chau et al. | ............ 252/301.4 P |
| 5,132,042 A | * | 7/1992 | Chau et al. | ............ 252/301.4 P |
| 5,154,852 A | * | 10/1992 | Chau | ............ 252/301.4 P |
| 5,156,764 A | | 10/1992 | Kaneda et al. | |
| 5,651,920 A | * | 7/1997 | Chau et al. | ............ 252/301.4 P |
| 5,725,800 A | * | 3/1998 | Huguenin | ............ 252/301.4 P |
| 6,398,970 B1 | | 6/2002 | Juestel et al. | |
| 6,734,631 B2 | | 5/2004 | Juestel et al. | |

* cited by examiner

*Primary Examiner*—C. Melissa Koslow
(74) *Attorney, Agent, or Firm*—Robert F. Clark

(57) ABSTRACT

The sensitivity of $YPO_4$:Ce phosphors to 185 nm radiation may be increased by incorporating a praseodymium coactivator. The use of Ce and Pr as co-activators in a $YPO_4$ phosphor improves the sensitivity of the phosphor to excitation by both 185 nm and 254 nm radiation and should increase total UVA and UVB output in fluorescent lamps. The co-activated phosphor has emission peaks at about 355 nm and about 335 nm.

6 Claims, 5 Drawing Sheets

CE,PR-COACTIVATED YTTRIUM PHOSPHATE PHOSPHOR AND LAMP CONTAINING SAME

TECHNICAL FIELD

This invention relates to UV-emitting phosphors and lamps containing UV-emitting phosphors. More particularly, this invention relates to yttrium phosphate phosphors and suntan lamps containing same

BACKGROUND OF THE INVENTION

Ultraviolet (UV)-emitting phosphors are used in fluorescent lamp applications for skin tanning where both UVA and UVB radiation is needed. UVA is defined by the U.S. Food & Drug administration (FDA) as radiation from 320 nm to 400 nm and UVB is defined as radiation from 260 nm to 320 nm. In general, UVA radiation mainly induces immediate pigmentation. This results in fast tanning and a grayish-brown color of the skin that disappears after a short time. On the other hand, UVB radiation promotes a long-lasting, reddish brown tanning of the skin. However, prolonged exposure to UVB radiation will also result in severe sunburn. Thus, the majority of the UV flux generated by tanning lamps is emitted in the UVA region with the balance in the UVB region.

To provide a fairly good tan, a suntan lamp usually produces a controlled amount of UVB for melanogensis and an amount of UVA sufficient to induce immediate pigment darkening. In the present state of the art, this is achieved by blending different UVA- and UVB-emitting phosphors to yield a proper balance of UVA and UVB, generally intended to mimic the relative proportions of UVA and UVB in natural sunlight. The most common UVA-emitting phosphor is lead-activated barium disilicate ($BaSi_2O_5$:Pb). Among all the UVA-emitting phosphors available in the current market, the $BaSi_2O_5$:Pb phosphor exhibits the strongest UVA emission under 254 nm excitation with its peak emission occurring at about 350 nm. Therefore, at the present time, the majority of suntan lamps use phosphor blends containing a large proportion of $BaSi_2O_5$:Pb as the major UVA-emitting phosphor and a much smaller amount of a UVB-emitting phosphor such as $MgSrAl_{11}O_{17}$:Ce, $LaPO_4$:Ce, or $(Ca,Zn)_3(PO_4)_2$:Tl.

However, there are drawbacks to the use of the $BaSi_2O_5$:Pb phosphor. One drawback is that like most silicate phosphors the lumen maintenance of the $BaSi_2O_5$:Pb phosphor in fluorescent lamps is poor relative to other fluorescent lamp phosphors. In order to improve lumen maintenance, a protective alumina coating is typically applied to the phosphor particles. A preferred method for applying the protective coating to the phosphor particles is via a CVD reaction in a fluidized bed (U.S. Pat. Nos. 5,223,341 and 4,710,674). While effective, this CVD method requires relatively complex coating equipment and hazardous chemicals. Another drawback is the lead activator itself. There is increasing pressure on all manufacturers to eliminate lead from their products because of environmental concerns related to their disposal. Thus, a lead-free, non-silicate alternative to the $BaSi_2O_5$:Pb phosphor would offer a significant advantage to lamp manufacturers.

Phosphate phosphors generally achieve higher lumen maintenance levels than silicate, borate, and aluminate phosphors in fluorescent lamps. There are three common cerium-activated orthophosphate phosphors including $YPO_4$:Ce, $LaPO_4$:Ce, and $GdPO_4$:Ce which all give a strong UV emission when excited by 254 nm radiation. The $YPO_4$:Ce phosphor exhibits essentially all UVA emission with two main emission peaks occurring close to 335 nm and 355 nm while $LaPO_4$:Ce displays a strong UVB emission with a major peak at 316 nm and a shoulder peak at 333 nm. The main emission peak of $GdPO_4$:Ce is near 312 nm which is the typical emission found in all $Gd^{3+}$ containing phosphors. Of these phosphors, $YPO_4$:Ce would be the best choice as an alternative UVA-emitting phosphor in a lead-free suntan lamp. However, the initial UVA output of $YPO_4$:Ce is at least 5% lower than that of $BaSi_2O_5$:Pb in a suntan lamp. Thus, it would be an advantage to improve the UVA output of a $YPO_4$:Ce phosphor in order to provide an acceptable alternative to the $BaSi_2O_5$:Pb phosphor.

SUMMARY OF THE INVENTION

Suntan lamps are based on the conventional low-pressure mercury discharge lamp prevalent in fluorescent lighting. The primary UV excitation energy emitted by a low-pressure mercury discharge is at 254 nm. However, a sizeable portion of the total UV radiation is also emitted at 185 nm. The amount of 185 nm radiation depends upon the fill gas composition and pressure of the lamp, but typically comprises 8-10% of the total UV radiation. Unfortunately, the conventional $YPO_4$:Ce phosphor is poorly excited by 185 nm radiation, so that this energy is partially wasted with respect to this phosphor.

We have discovered that the sensitivity of the $YPO_4$:Ce phosphor to 185 nm radiation may be increased by incorporating a praseodymium coactivator into the phosphor. The use of Ce and Pr as co-activators in a $YPO_4$ phosphor improves the sensitivity of the phosphor to excitation by both 185 nm and 254 nm radiation and should increase total UVA and UVB output in fluorescent lamps.

In general, the phosphor may be represented by the formula $YPO_4$:Ce,Pr and has emission peaks at about 355 nm and about 335 nm. In a more preferred embodiment, the cerium and praseodymium coactivated yttrium phosphate phosphor of this invention is represented by the formula $(Y_{1-x-y}Ce_xPr_y)PO_4$, where x is from about 0.01 to about 0.20, and y is from about 0.001 to about 0.05. More preferably, x is from about 0.02 to about 0.08 and y is from about 0.002 to about 0.02.

In accordance with another aspect of the invention, there is provided a method of making a Ce,Pr-coactivated yttrium phosphate phosphor comprising combining a flux with stoichiometric amounts of a phosphate source, a yttrium source, a cerium source, and a praseodymium source to form a mixture. Preferably, the flux is selected from a lithium-containing compound, a boron-containing compound, or a combination thereof. The lithium-containing compound is preferably lithium carbonate and the boron-containing compound is preferably boric acid. The mixture is then fired at a temperature and for a time sufficient to form the phosphor. Preferably, the mixture is fired in a reducing atmosphere such as a $H_2/N_2$ gas mixture.

In one alternative method, the Ce,Pr-coactivated yttrium phosphate phosphor of this invention may be produced by a dry method from a mixture of the respective oxides of Y, Ce, and Pr or compounds of Y, Ce and Pr which are capable of being converted to oxides of Y, Ce and Pr. These would include nitrates, sulfates, halides or hydroxides of Y, Ce and Pr. This mixture further includes a flux and a phosphorus-containing compound such as diammonium hydrogen phosphate (DAP), ammonium dihydrogen phosphate, or boron phosphate. The mixture may be fired in a single or multiple firing steps. Preferred conditions include firing for about 3 hours to about 10 hours at a temperature from about 800° C. to about 1400° C. in an inert gas (Ar or $N_2$) or a reducing atmosphere such as a nitrogen gas containing a small amount of hydrogen gas.

In another alternative method, the Ce,Pr-coactivated yttrium phosphate phosphor of the present invention may be produced by a wet method wherein an aqueous solution containing Y, Ce, and Pr is reacted with a stoichiometric amount, or slight excess, of a phosphorus-containing compound such as DAP in a pH-adjusted solution at a temperature from about 70° C. to about 95° C. to form a co-precipitate of mixed (Y, Ce, Pr) phosphate. The phosphate co-precipitate is then fired at a temperature from about 600° C. to about 800° C. A lithium-containing compound and/or a boron-containing compound may be added as a flux to the fired phosphate co-precipitate and the mixture fired at a temperature from about 800° C. to about 1400° C. in an inert or a reducing atmosphere.

In a further alternative method, the Ce,Pr-coactivated yttrium phosphate phosphor of the present invention may also be synthesized from a mixed (Y, Ce, Pr) oxide co-precipitate. The sources of Y, Ce and Pr are dissolved in hot nitric acid to form a solution containing Y, Ce, and Pr. Oxalic acid or ammonia is added to form a co-precipitate of oxalates or hydroxides which are further fired to obtain mixed co-precipitated oxides of Y, Ce and Pr. The mixed oxides can be then combined with a flux and phosphate source and fired to form the phosphor.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Five phosphors were prepared with a general composition of $(Y_{1-x-y}Ce_xPr_y)PO_4$, where x=0.04, and y=0, 0.001, 0.002, 0.005, and 0.01. Table 1 lists the Ce, Pr and Y levels (moles of activator/mole of phosphor) of the $(Y_{1-x-y}Ce_xPr_y)PO_4$ phosphor samples and weights of materials used for the phosphor synthesis. In order to make the phosphate co-precipitate, $Ce(NO_3)_3 \cdot 6H_2O$, $Y_2O_3$, and $Pr_4O_7$ were dissolved in a dilute nitric acid solution at a temperature from about 85° C. to about 95° C. The cooled solution was then slowly added into 1.2 moles of a dilute diammonium hydrogen phosphate (DAP) solution which was kept at a temperature from about 80° C. to about 90° C. and a pH from 1.0 to 1.5 for one hour in order to form co-precipitated phosphates of Y, Ce, and Pr. After settling, the supernate was decanted and the phosphate co-precipitate was resuspended in cold water and agitated for 10 minutes. This procedure was repeated until the solution reached a pH of 2 or above. After a final decantation, the phosphate co-precipitate was placed in a drying oven at 65° C. for 12 hours and then fired for 3 hours at 750° C. in air to obtain mixed phosphates of Y, Ce, and Pr. A 160 gram amount of the fired phosphates was thoroughly mixed with 5 grams of lithium carbonate and 80 grams of boric acid. The mixture was then fired in a $H_2/N_2$ atmosphere in an alumina crucible at a temperature of 1200° C. for about 3 hours. The resulting phosphor was soaked in hot water for 1 hour, washed, filtered, dried, and sifted –60 mesh.

TABLE 1

Formulations of $(Y_{1-x-y}Ce_xPr_y)PO_4$ Phosphor Samples

| | $(Y_{1-x-y}Ce_xPr_y)PO_4$ | | | Weight of Raw Materials (g) | | |
|---|---|---|---|---|---|---|
| | x | y | 1 – x – y | $Ce(NO_3)_3 \cdot 6H_2O$ | $Pr_4O_7$ | $Y_2O_3$ |
| Sample 1 (Control) | 0.04 | 0 | 0.96 | 15.53 | 0 | 97.99 |
| Sample 2 | 0.04 | 0.001 | 0.959 | 15.63 | 0.29 | 97.89 |
| Sample 3 | 0.04 | 0.002 | 0.958 | 15.63 | 0.58 | 97.79 |
| Sample 4 | 0.04 | 0.005 | 0.955 | 15.63 | 1.46 | 97.48 |
| Sample 5 | 0.04 | 0.01 | 0.95 | 15.63 | 2.92 | 96.97 |

Figure 1:
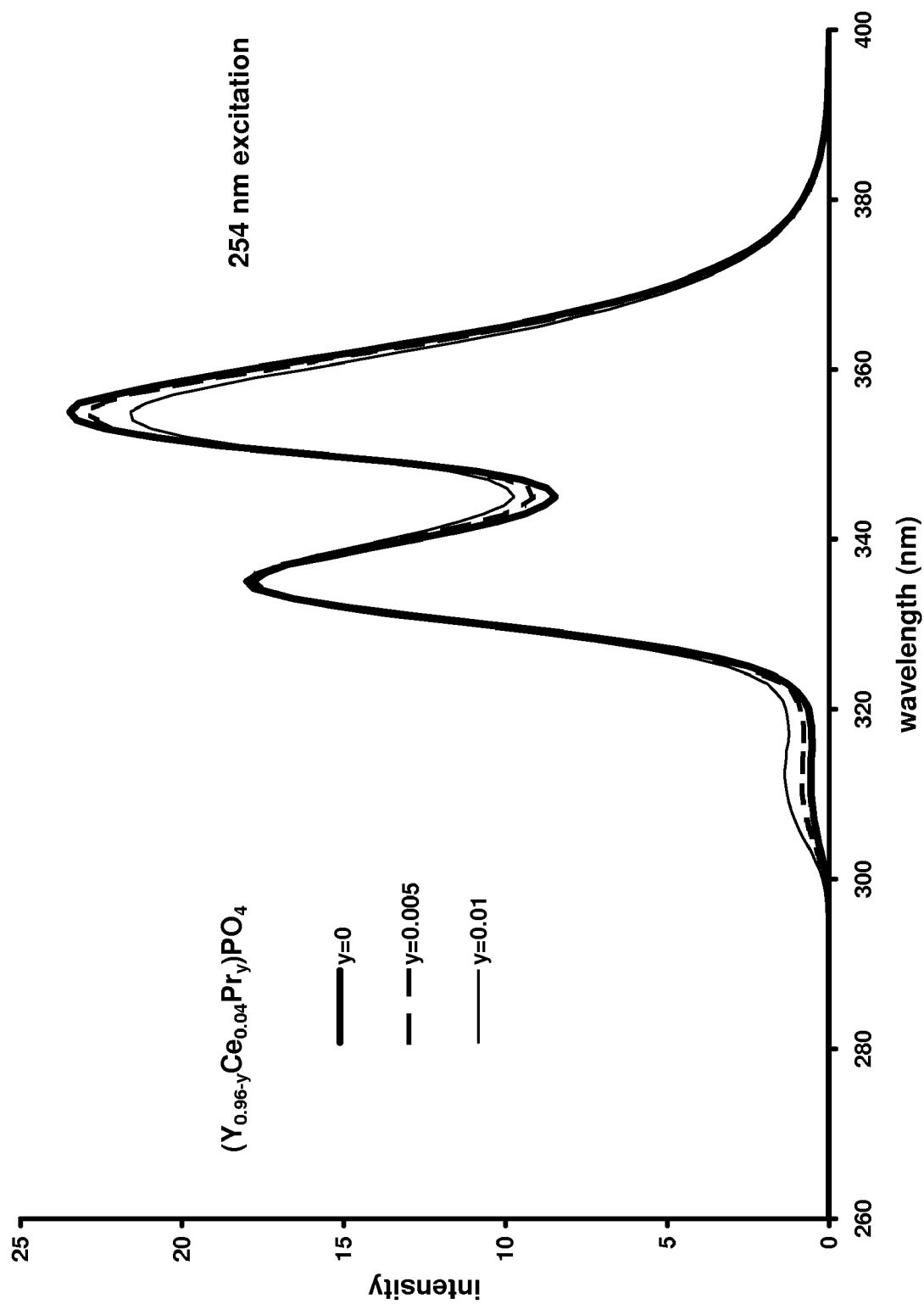
FIG. 1 shows the emission spectra between 260 nm and 400 nm of various $YPO_4$:Ce,Pr phosphors under 254 nm excitation radiation.
Figure 2:
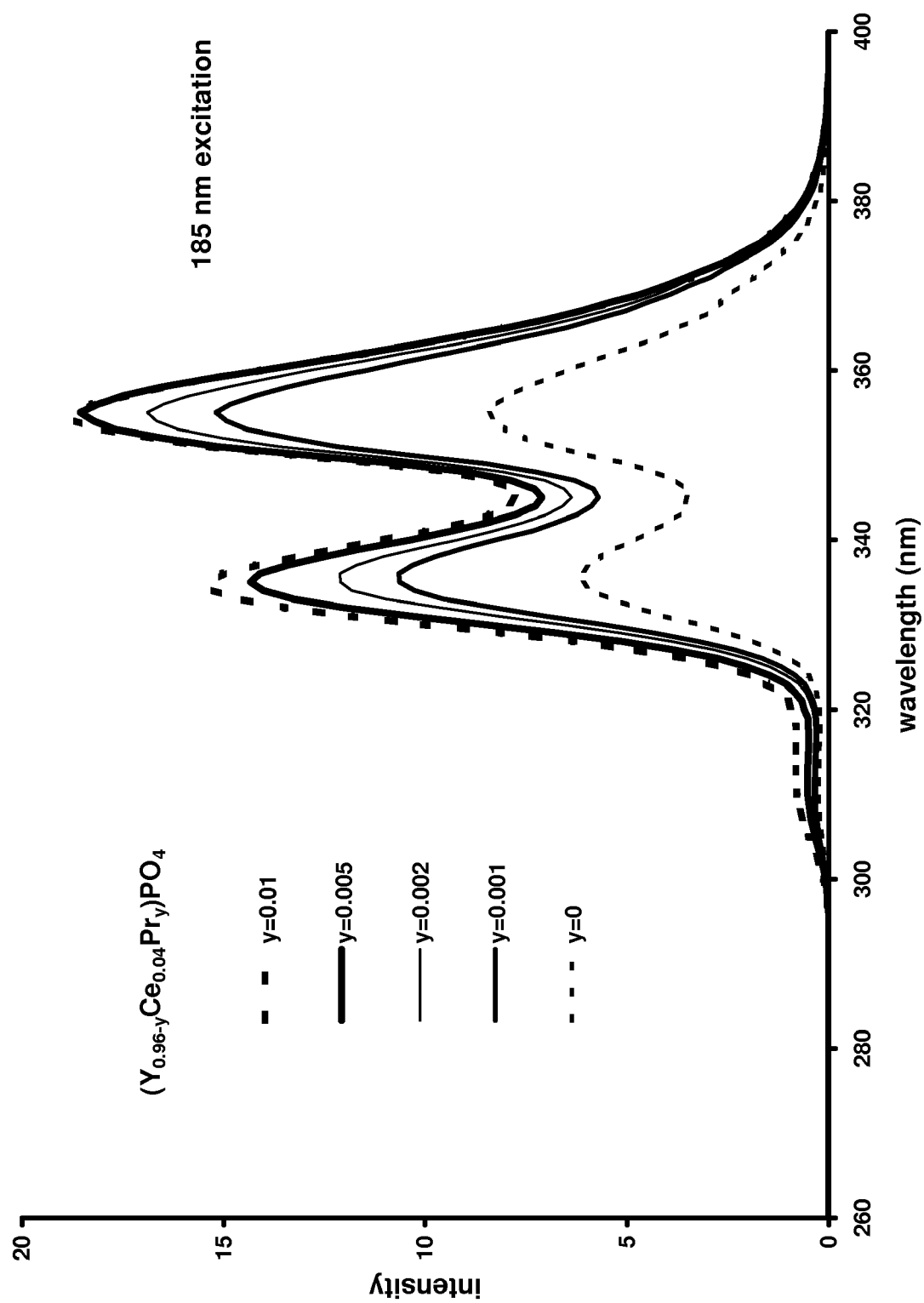
FIG. 2 shows the emission spectra between 260 nm and 400 nm of various $YPO_4$:Ce,Pr phosphors under 185 nm excitation radiation.

The emission and excitation spectra of the various $YPO_4$:Ce,Pr phosphors were measured using an Acton SpectraPro-2500i monochromator/spectrograph equipped with a deuterium light source and a VM-504 vacuum monochromator. FIG. 1 compares the UVA and UVB emissions of the $YPO_4$:Ce,Pr phosphors under 254 nm excitation and FIG. 2 compares the UVA and UVB emissions under 185 nm excitation. It is readily apparent from FIG. 2 that the addition of Pr has increased the sensitivity of the $YPO_4$:Ce phosphor to 185 nm radiation in relation to the concentration of the Pr activator. Moreover, the co-activation nearly maintains the phosphor's response to 254 nm radiation.

Figure 3:
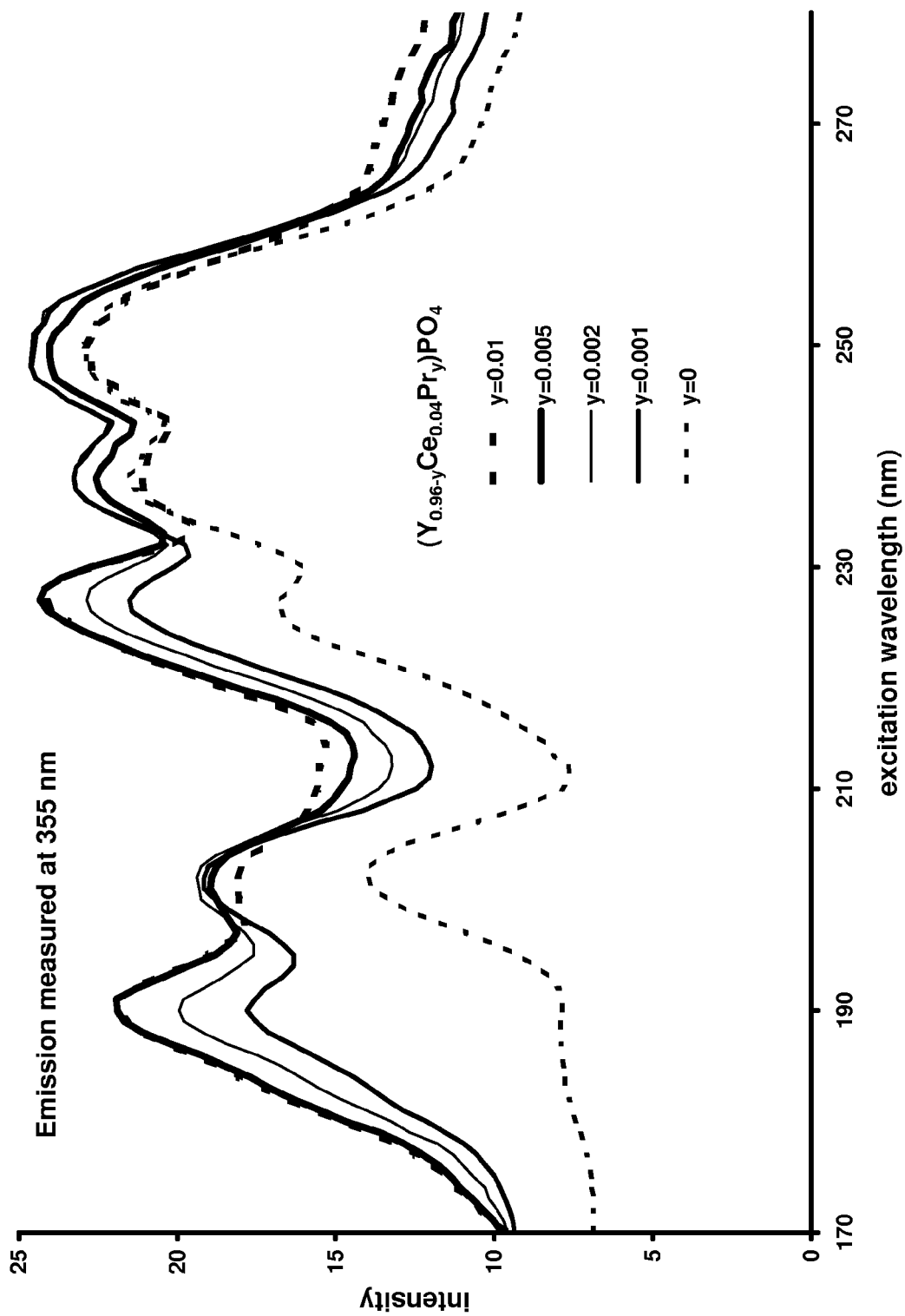
FIG. 3 compares the excitation spectra of various $YPO_4$:Ce,Pr phosphors measured for an emission at 355 nm.
Figure 4:
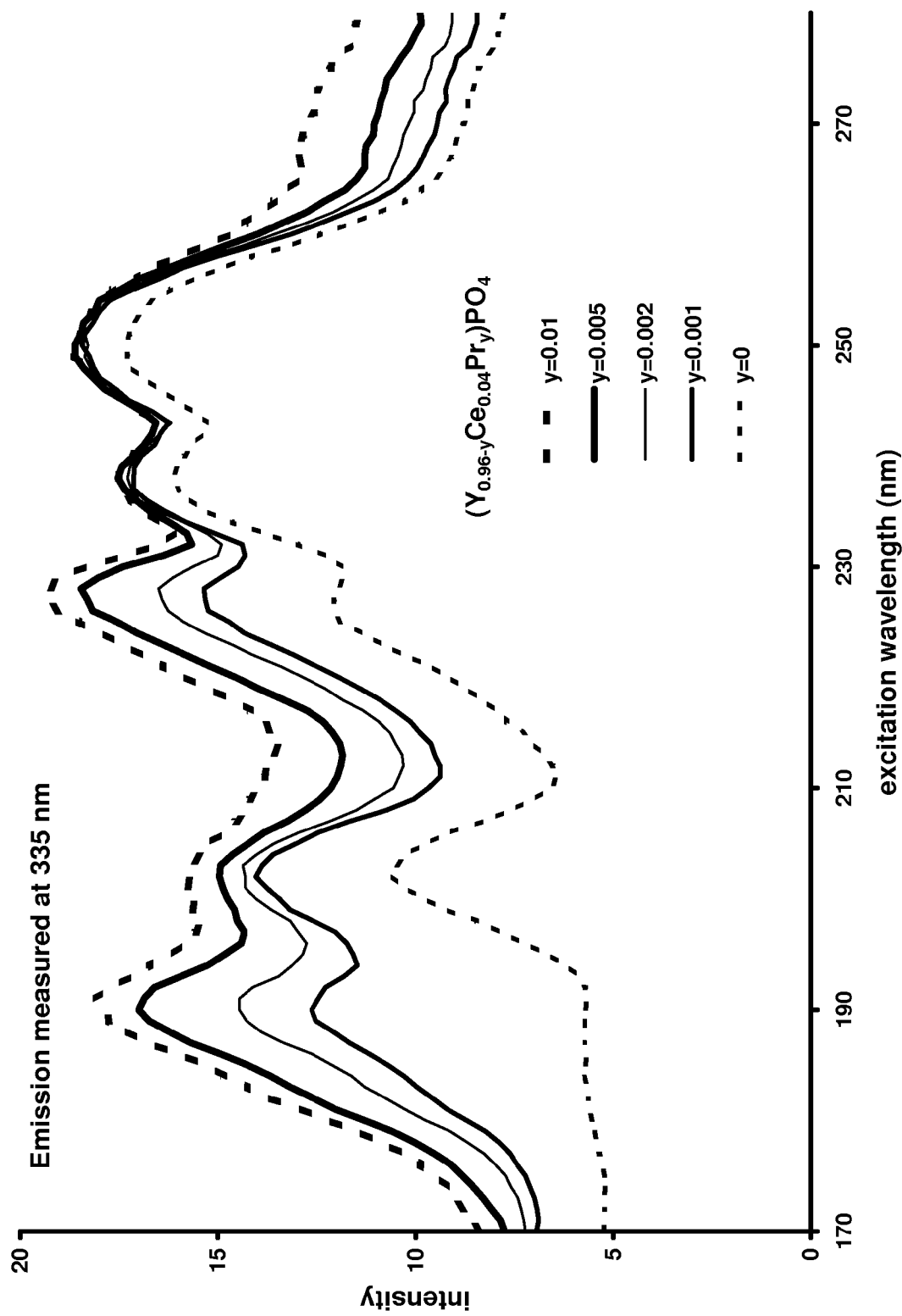
FIG. 4 compares the excitation spectra of various $YPO_4$:Ce,Pr phosphors measured for an emission at 335 nm.

A better view of the increased 185 nm sensitivity of the coactivated phosphor may be seen in FIGS. 3 and 4 which show the excitation spectra of the phosphors measured for emissions at 355 nm and 335 nm, respectively. These spectra were corrected relative to the excitation curve of a sodium salicylate standard. As expected from the response demonstrated in FIG. 2, the excitation curves for the coactivated $YPO_4$:Ce,Pr phosphors exhibit a steady increase in intensity in the VUV region below about 200 nm with increasing Pr concentrations.

Phosphor samples were packed into plaques and excited by either 254 nm or 185 nm radiation from a mercury discharge. The emission of each sample was measured from 260 to 400 nm and the areas under the UVA (321-400 nm) and the UVB (260-320 nm) regions calculated. Table 2 lists the integrated area of their UVA and UVB emissions under 254 nm and 185 nm radiation and overall relative brightness intensity. A calculated total brightness is provided to simulate the performance of the phosphor under excitation by a low-pressure mercury discharge. This quantity was calculated by adding 8% of the integrated emission intensity under 185 nm excitation to 92% of the integrated emission intensity under 254 nm excitation. These percentages represent the approximate relative proportions of the UV radiation emitted by a low-pressure Hg discharge.

TABLE 2

Integrated Emission Intensities of $(Y_{1-x-y}Ce_xPr_y)PO_4$ Phosphor Samples Between 260 nm and 400 nm

| | Integrated Area Under 254 nm Radiation | | | Integrated Area Under 185 nm Radiation | | | Calculated Total Brightness | | |
|---|---|---|---|---|---|---|---|---|---|
| | UVA | UVB | Sum, % | UVA | UVB | Sum, % | UVA | UVB | Sum, % |
| Sample 1 (control) | 639.9 | 9.4 | 100 | 231.2 | 4.1 | 100 | 607.2 | 9.0 | 100 |
| Sample 2 | 641.5 | 8.9 | 100.2 | 403.1 | 5.5 | 173.7 | 622.5 | 8.6 | 102.4 |
| Sample 3 | 644.4 | 10.4 | 100.8 | 453.2 | 6.5 | 195.4 | 629.1 | 10.1 | 103.7 |
| Sample 4 | 640.7 | 13.1 | 100.8 | 513.4 | 8.9 | 222.0 | 630.5 | 12.8 | 104.4 |
| Sample 5 | 633.1 | 22.0 | 100.9 | 538.5 | 13.6 | 234.7 | 625.5 | 21.3 | 105.0 |

Table 2 shows that all the Ce,Pr-coactivated yttrium phosphate phosphor samples exhibited significantly higher UVA and UVB emissions than the Ce only-activated control under 185 nm excitation. The enhancement of UVA and UVB emissions under 185 nm excitation was continuously improved by increasing the concentration of Pr. FIG. 2 confirms that the phosphor emission peaks at 355 nm, 335 nm, and 310 nm became stronger under 185 nm excitation with increasing Pr concentration. Under 254 nm excitation, the UVA emission improved slightly as the Pr concentration was increased to 0.002 moles Pr/mole of phosphor and then decreased gradually as the Pr concentration was increased to 0.01 moles Pr/mole of phosphor. These results can be further explained by referring to the emission spectra shown in FIG. 1. At 0.005 and 0.01 moles Pr/mole of phosphor, the intensity of the primary 355 nm emission peak lessened slightly under 254 nm excitation. Although the secondary 335 nm emission peak remained the same, the broader 310 nm emission intensified. Due to this continuous improvement of UVB emission, all the Ce,Pr-coactivated samples displayed about the same or slightly better overall UV (UVA+UVB) emission intensity than the Ce only-activated control under 254 nm excitation. As seen in Table 2, when the Pr concentration was increased to 0.005 moles Pr/mole of phosphor, the calculated total UVA emission appeared to reach a maximum under the combined 254 nm and 185 nm excitation. However, the calculated total UVB emission continued to increase with increasing Pr concentration under the combined excitation. Thus, all of the Ce,Pr-coactivated phosphor samples had a calculated total UV brightness which was greater than the Ce only-activated control. This indicates that the Ce,Pr-coactivated phosphor of this invention should exhibit better performance in a fluorescent lamp when excited with a low-pressure mercury discharge.

Figure 5:
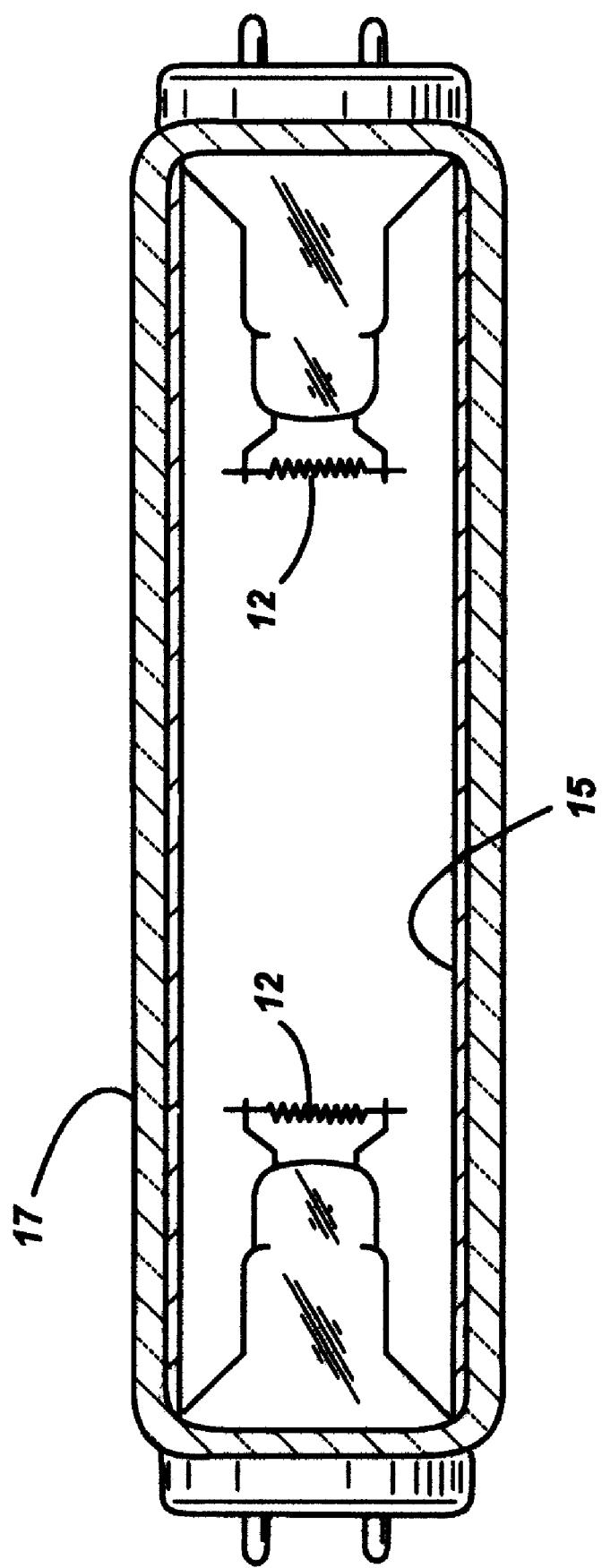
FIG. 5 is a cross-sectional illustration of a fluorescent lamp having a phosphor coating containing the $YPO_4$:Ce,Pr phosphor.

FIG. 5 is a cross-sectional illustration of a fluorescent lamp having a phosphor coating containing the $YPO_4$:Ce,Pr phosphor of this invention. The lamp has a hermetically sealed glass envelope 17. The interior of the envelope 17 is filled with an inert gas such as argon or a mixture of argon and krypton at a low pressure, for example 1-3 torr, and a small quantity of mercury, at least enough to provide a low vapor pressure of mercury during operation. An electrical discharge is generated between electrodes 12 to excite the mercury vapor to generate ultraviolet radiation. A phosphor coating 15 is applied to the interior surface of the envelope 17 to convert at least a portion of the ultraviolet radiation emitted by the low-pressure mercury discharge into a desired wavelength range. The phosphor coating 15 contains the $YPO_4$:Ce,Pr phosphor which emits UVA and UVB radiation when stimulated by the ultraviolet radiation emitted by the discharge. The phosphor coating may contain other phosphors in order to adapt the spectral output of the lamp to the desired application, including, but not limited to other UV-emitting and/or visible light-emitting phosphors.

While there have been shown and described what are present considered to be the preferred embodiments of the invention, it will be apparent to those skilled in the art that various changes and modifications can be made herein without departing from the scope of the invention as defined by the appended claims.

We claim:

1. A UV-emitting phosphor comprising yttrium phosphate activated with cerium and praseodymium, the phosphor being represented by a formula $(Y_{1-x-y}Ce_xPr_y)PO_4$, where x is from about 0.01 to about 0.20, and y is from about 0.001 to about 0.05.

2. The phosphor of claim 1 wherein the phosphor has emission peaks at about 355 nm and about 335 nm.

3. The phosphor of claim 1 wherein x is from about 0.02 to about 0.08 and y is from about 0.002 to about 0.02.

4. A lamp comprising a glass envelope having a phosphor coating on an interior surface, the phosphor coating containing a UV-emitting phosphor comprising yttrium phosphate activated with cerium and praseodymium, the phosphor being represented by a formula $YPO_4$:Ce,Pr, the envelope being hermetically sealed and containing an amount of mercury and an inert gas, the lamp generating a discharge that emits 254 nm and 185 nm radiation when operating.

5. A lamp comprising a glass envelope having a phosphor coating on an interior surface, the phosphor coating containing a UV-emitting phosphor comprising yttrium phosphate activated with cerium and praseodymium, the phosphor being represented by a formula $(Y_{1-x-y}Ce_xPr_y)PO_4$, where x is from about 0.01 to about 0.20, and y is from about 0.001 to about 0.05, the envelope being hermetically sealed and containing an amount of mercury and an inert gas, the lamp generating a discharge that emits 254 nm and 185 nm radiation when operating.

6. The lamp of claim 5 wherein x is from about 0.02 to about 0.08 and y is from about 0.002 to about 0.02.

* * * * *